United States Patent
Harnetiaux

(10) Patent No.: US 9,080,598 B2
(45) Date of Patent: Jul. 14, 2015

(54) DOUBLE SIDED DOUBLE TELESCOPING DRIVE COUPLING

(71) Applicant: CNH America LLC, New Holland, PA (US)

(72) Inventor: Travis Lester Harnetiaux, Bourbonnais, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 13/927,589

(22) Filed: Jun. 26, 2013

(65) Prior Publication Data

US 2015/0005081 A1   Jan. 1, 2015

(51) Int. Cl.
*F16C 3/03* (2006.01)
*F16D 3/38* (2006.01)

(52) U.S. Cl.
CPC .... *F16C 3/03* (2013.01); *F16D 3/38* (2013.01)

(58) Field of Classification Search
USPC .......... 464/162, 167, 169, 172, 182; 180/384; 56/13.5, 13.8, DIG. 6
See application file for complete search history.

(56) References Cited

U.S. PATENT DOCUMENTS

| | | | |
|---|---|---|---|
| 2,695,504 A | 5/1951 | Magee | |
| 4,236,388 A | 12/1980 | Geisthoff | |
| 5,115,691 A * | 5/1992 | Beauch | 464/162 |
| 5,507,203 A | 4/1996 | Audibert et al. | |
| 5,732,600 A * | 3/1998 | Peterson et al. | 74/492 |
| 5,827,122 A | 10/1998 | Kurian | |
| 5,902,186 A * | 5/1999 | Gaukel | 464/162 |
| 5,938,534 A * | 8/1999 | Kurian et al. | 464/162 |
| 6,241,616 B1 | 6/2001 | Lightcap | |
| 6,287,208 B1 * | 9/2001 | Faulkenberry et al. | 464/169 |
| 6,381,933 B1 | 5/2002 | Wanner et al. | |
| 6,626,765 B2 * | 9/2003 | Kim | 464/179 |
| 6,739,976 B2 | 5/2004 | Glowacki et al. | |
| 6,752,560 B2 * | 6/2004 | Wilson et al. | 464/182 |
| 7,207,890 B2 | 4/2007 | Lukac | |
| 7,238,113 B2 | 7/2007 | Lukac | |
| 8,057,313 B2 * | 11/2011 | Jacob | 464/140 |

FOREIGN PATENT DOCUMENTS

| | | |
|---|---|---|
| FR | 1250442 | 1/1961 |
| GB | 856766 | 12/1960 |

OTHER PUBLICATIONS

"Conform." Dictionary.com. [online], [retrieved on Oct. 7, 2014] Retrieved from the Internet <URL: http://dictionary.reference.com/browse/conform >.*

* cited by examiner

*Primary Examiner* — Gregory Binda
*Assistant Examiner* — Josh Skroupa
(74) *Attorney, Agent, or Firm* — Rebecca L. Henkel

(57) ABSTRACT

A double-sided drive shaft with a telescoping end on each side is provided. In particular the double-sided drive shaft is also double-telescoping because each telescoping end on each side of the double-sided drive shaft is able to extend and retract. The double-sided drive shaft is configured to transfer rotation from a rotational power source within an agricultural implement. The double-sided and double-telescoping drive shaft includes one or more shafts and one or more sleeves having an interior surface configured to transfer torque.

20 Claims, 4 Drawing Sheets

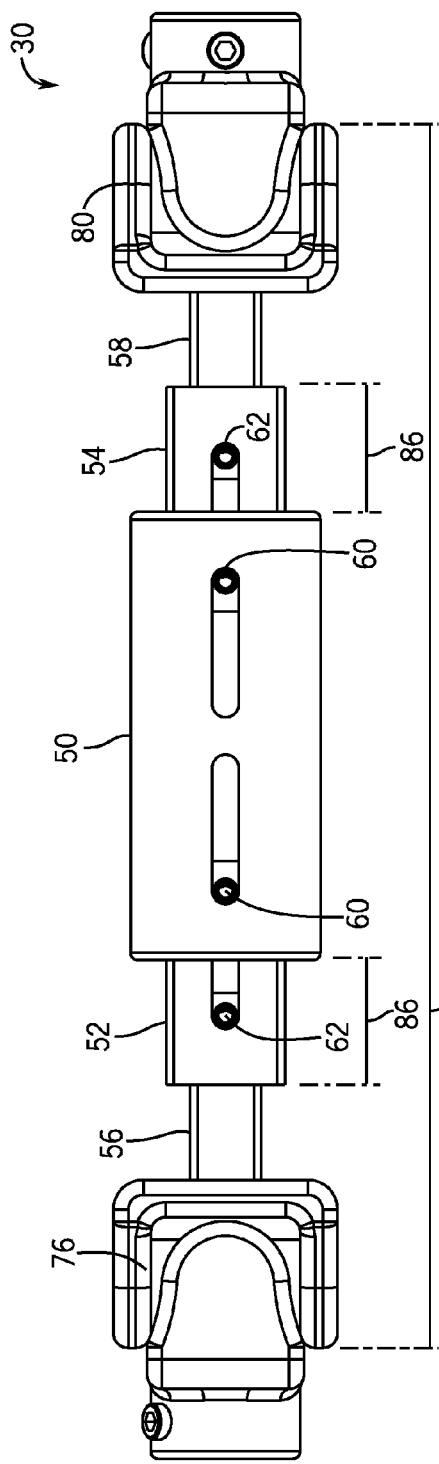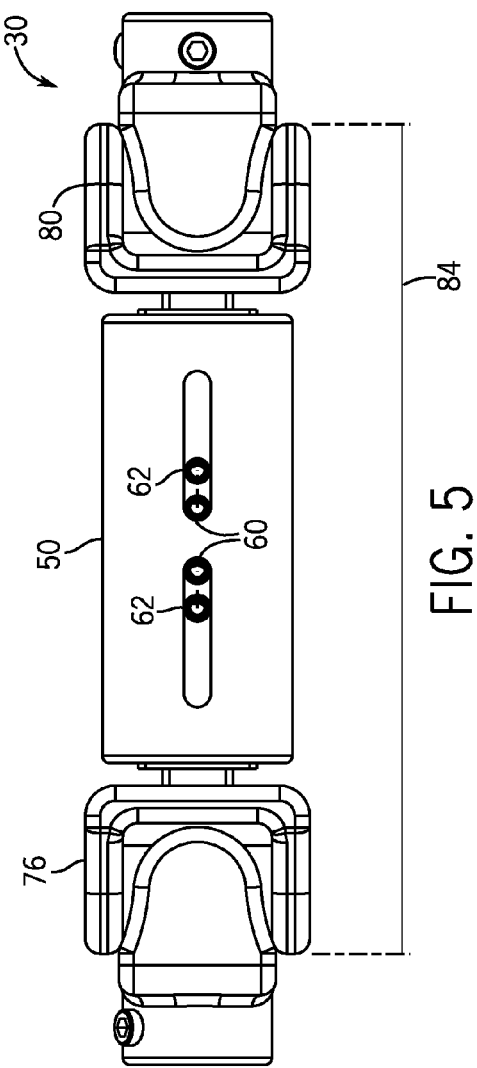

DOUBLE SIDED DOUBLE TELESCOPING DRIVE COUPLING

BACKGROUND

The present invention relates generally to the field of agricultural implements such as planters, seeders and other wide, foldable implements towed behind a work vehicle, such as a tractor. More particularly, the present invention relates to a telescoping drive shaft for use within the foldable implements towed behind the work vehicle.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and reclose the soil in a single operation. Seeds are commonly dispensed from seed tanks and distributed to row units by a distribution system. To make the seeding operation as efficient as possible, very wide swaths may be covered by extending wings on either side of a center section of the implement pulled by the tractor. Included in the wing assemblies are tool bars, row units mounted thereon, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated by the support wheels to disengage the row units from the ground and folded forward to reduce the width of the implement The foldable wing assemblies include multiple row units configured to deposit seeds within the soil with a metering system. Each of the row units uses a rotatable power source to power the metering system, such as an electrical or hydraulic motor, or a drive wheel. The power source may be from an external source, or may be positioned on the center section. In particular, various shafts are typically used within the wing assemblies to transfer rotational power from the power source and through the length of the tool bars and/or between adjacent row units. Multiple primary gearboxes are rotatably coupled to the shafts, which are then configured to use the rotation for driving downstream components within the row unit, such as the metering system. Typically, standard shafts are limited to the amount of space provided within the region of the wing assemblies where these drive shafts must fit. Further, standard shafts may be fixed in length, providing little extension or retraction movement.

However, drive shafts within the wing assemblies often desire flexibility as the wing assemblies transition between, for instance, ground engaging positions and transport positions. For example, in certain situations, a drive shaft disposed at pivot locations on the agricultural implement, such as between the power source on the center section and each wing assembly, may transfer rotational power. Unfortunately, given the limited extension and retraction the standard drive shaft provides, the drive shaft may be restricting the movement of the wing. Further, in some circumstances, the row units may need to be periodically separated sufficiently enough for maintenance and servicing operations (e.g., emptying, cleaning, etc.). However, given the standard drive shaft's limited freedom of movement, it may be difficult to separate row units without disconnecting rotational power. As such, it may be desirable to provide a drive shaft with a greater amount of extension and retraction flexibility.

BRIEF DESCRIPTION

Embodiments of the invention provide a double-sided drive shaft with a telescoping end on each side, such that each telescoping end is able to extend and retract. These embodiments may be used in a wide range of settings, but are particularly well suited for transmitting rotational power at pivot locations on an agricultural implement, such as between the center section and each wing assembly. In some situations, it may also be well suited for transmitting rotational power between adjacent row units on a foldable wing assembly. Indeed, a double-telescoping configuration provides a drive shaft with more rotational freedom and greater extension, even within regions having a limited amount of space. For example, a drive shaft with a double-telescoping configuration may be capable of movement in multiple directions, as opposed to a standard drive shaft without any telescoping functionality or a drive shaft with telescoping functionality in only one direction.

In certain embodiments, the double-sided and double-telescoping drive shaft includes a driving shaft, a driven shaft, a center sleeve, a first intermediate sleeve, a second intermediate sleeve, and a plurality of retaining members. Each sleeve may be a tubular configuration with two opposing open ends and may have an interior surface configured to transfer torque. The first intermediate sleeve may be slidingly received in a first side of the center sleeve, such that the interior surface of the first intermediate sleeve is at least partially conforming to the interior surface of the center sleeve. Likewise, the second intermediate sleeve may be slidingly received in a second side of the center sleeve, such that the interior surface of the second intermediate sleeve is at least partially conforming to the interior surface of the center sleeve. A plurality of retaining members may be used to secure the arrangement of the center sleeve with the two intermediate sleeves without obstructing the extension and retraction movements of the telescoping pieces. Further, the driving shaft is slidingly received in the first intermediate sleeve, and is at least partially conforming to the interior surface of the first intermediate sleeve. Similarly, the driven shaft is slidingly received in the second intermediate sleeve, and is at least partially conforming to the interior surface of the second intermediate sleeve.

In further embodiments of this invention, the drive shaft may be used to rotatably couple two individual wing assembly shafts with a pair of universal joints. For example, one end of the drive shaft may include a first universal joint having a first yoke mounted to the drive shaft (e.g., driven shaft of the drive shaft) and rotatably connected to a yoke mounted to an individual wing shaft disposed on the wing assembly. Likewise, the other end of the drive shaft may include a second universal joint having a second yoke mounted to the drive shaft (e.g., driving shaft of the drive shaft) and rotatably connected to a yoke mounted to another individual wing shaft disposed on the wing assembly.

DRAWINGS

These and other features, aspects, and advantages of the present invention will become better understood when the following detailed description is read with reference to the accompanying drawings in which like characters represent like parts throughout the drawings, wherein:

FIG. 4 is a perspective view of the double-telescoping drive shaft of FIG. 2 in a telescopically expanded state, in accordance with present embodiments; and FIG. 5 is a perspective view of the double-telescoping drive shaft of FIG. 2 in a telescopically retracted state, in accordance with present embodiments.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
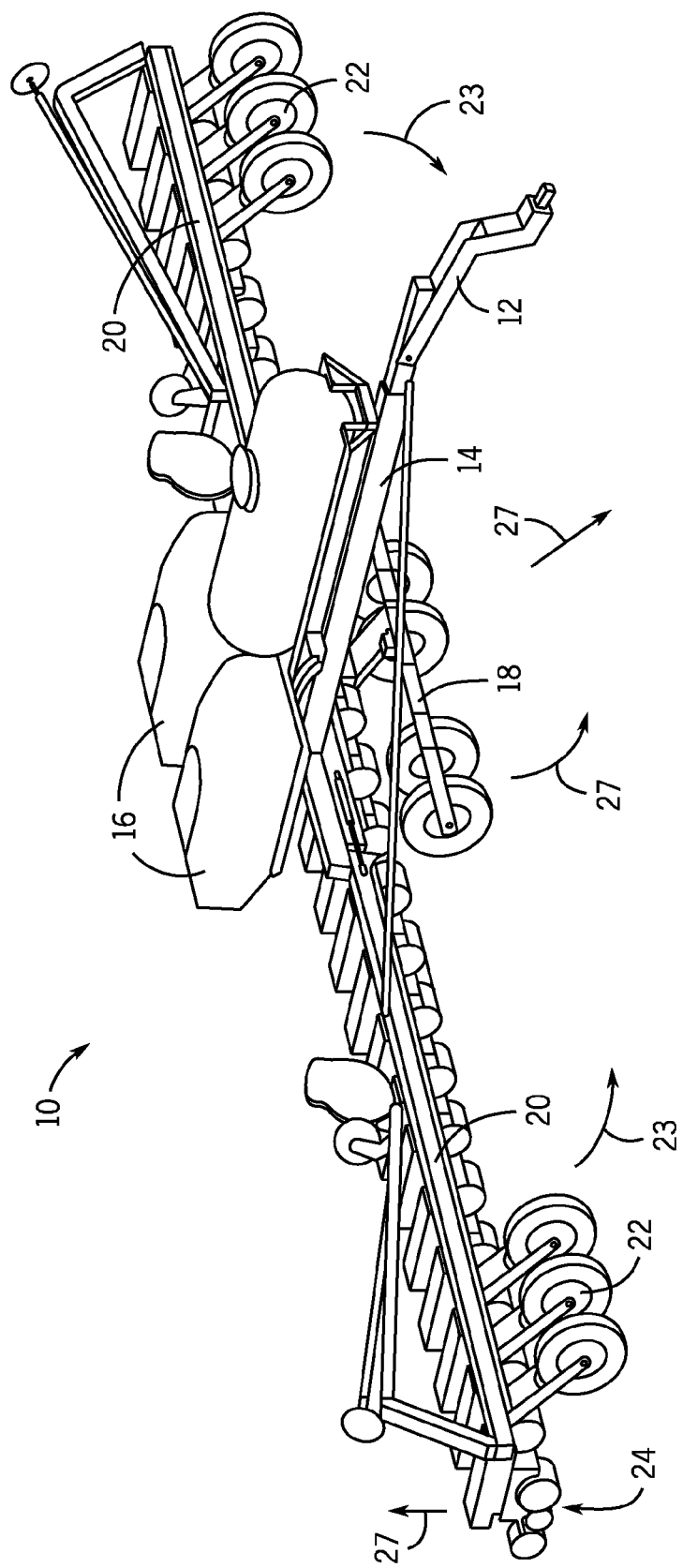
FIG. 1 is a perspective view of an embodiment an agricultural implement (e.g., a planter), illustrating wing assemblies having wing tool bars and wing row units disposed thereon.

Turning now to the drawings and referring first to FIG. 1, an agricultural implement 10 is illustrated in the form of a planter. The implement is designed to be towed behind a work vehicle such as a tractor. The implement includes a planter hitch assembly 12 which is attached to a tow bar 14. The planter hitch assembly 12 may be used to attach the planter 10 to a tractor and may be pivotally coupled to the tow bar 14 to allow flexibility as the planter implement changes elevation as it is towed across a terrain. Also included in the planter 10 is a center tool bar 16. The center tool bar 16 extends transversely with respect to the tow bar 14. In the embodiment, a center wheel assembly 18 is disposed below, and coupled, to the tow bar 14 and/or to the center tool bar 16. The center wheel assembly 18 may include an actuator that extends the assembly to a transport or deployed position.

Wing tool bars 20 are disposed on each side of the center tool bar 16. The wing tool bars 20 are pivotally coupled to the center tool bar 16, enabling the wing tool bars 20 to fold forward when the planter 10 is in a compacted transport position. When in the compacted transport position, the wing tool bars 20 are generally parallel to the center tool bar 16. The wing wheel assemblies 22 are used to lift the tool bars 20 from ground contact and engagement, thereby enabling the planter 10 to move to a transport position. The wing wheel assemblies 22 may be retracted or extended to move the wing tool bars from ground engaging position to transport position, respectively. As the wing wheel assemblies 22 are extended, shown by arrow 23, row units 24 are elevated above contact with the ground, thereby removing the planter 10 from the planter or ground engaging position. In an embodiment, the wing wheel assemblies 22 may be extended while the wing tool bars 20 are folded forward toward the center tool bar 16. When the wing tool bars 20 are fully folded, they may be elevated over the tow bar 14. The wing wheel assemblies 22 may then be retracted, enabling the wing tool bars 20 to lock to the tow bar 14, and enabling the wheels to interleave, thereby reducing the overall width of the planter 10 when in a compacted transport position. As the wing wheel assemblies 22 are retracted, the center wheel assembly 18 may be extended in direction 27, to elevate the implement 10 in transport mode.

In particular, a double-sided and double-telescoping drive shaft (shown in FIG. 2) may be disposed at pivot locations on the planter 10, such as the location where the wing tool bars 20 are pivotally coupled to the center tool bar 16. The double-telescoping drive shaft may be configured to provide a source of rotational power from an electrical or hydraulic motor to the wing tool bar 20. For example, the hydraulic motor may be attached to the center tool bar 16 and the double-telescoping drive shaft may be configured to transfer the rotational power generated by the hydraulic motor to the wing tool bars 20. As described below with reference to FIGS. 4-5, the double-telescoping drive shaft may be in a telescopically expanded state or in a telescopically retracted state. Indeed, the double-telescoping drive shaft may expand or contract based on the position of the wing tool bar 20 (e.g., engaging position, transport position, etc.).

Also attached to the wing tool bars 20 are the wing row units 24. The wing tool bars 20 support the row units 24, which are designed to dispense seeds along parallel rows and at a desired spacing in a field. Depending upon the design of the row units 24 and upon such factors as the nature of the field (e.g., tilled or untilled), each row unit 24 may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit for receiving seeds, fertilizer or other materials to be dispensed by the row units. A distribution system serves to communicate seeds from seed tanks to the various row units. In certain embodiments, the double-telescoping drive shaft may be positioned at other locations within the planter 10, such as between the row units 24 on the wing tool bar 20. In these embodiments, the double-telescoping drive shaft may transfer rotational power along the length of the wing tool bar 20 from row unit to adjacent row unit. As described in FIGS. 4-5, the double-telescoping drive shaft may be in an expanded state or in a retracted state. In the expanded state, the row units 24 may be positioned a particular distance apart, while in the retracted state, the row units 24 may be positioned closely together. In either state, the double-telescoping drive shafts may continue to maintain driving connectivity between adjacent row units 24, such that rotational power may be continuously transferred.

When the wing wheel assemblies 22 are extended in a downward and rearward direction 23 to an extended position, the wing row units 24 are lifted in an upward direction so as not to be in contact with the ground below. Moreover, the center wheel assembly 18 may also be extended in a downward and forward direction 27, toward the tractor, to a deployed position, further lifting the row units 24. When extended, the center wheel assembly 18 may provide increased clearance for the implement 10 during transport. The wing tool bars 20 may be folded in a forward direction 29 while the wing row units 24 are elevated, enabling the wing tool bars 20 to fold inward toward the tow bar 14.

Figure 2:
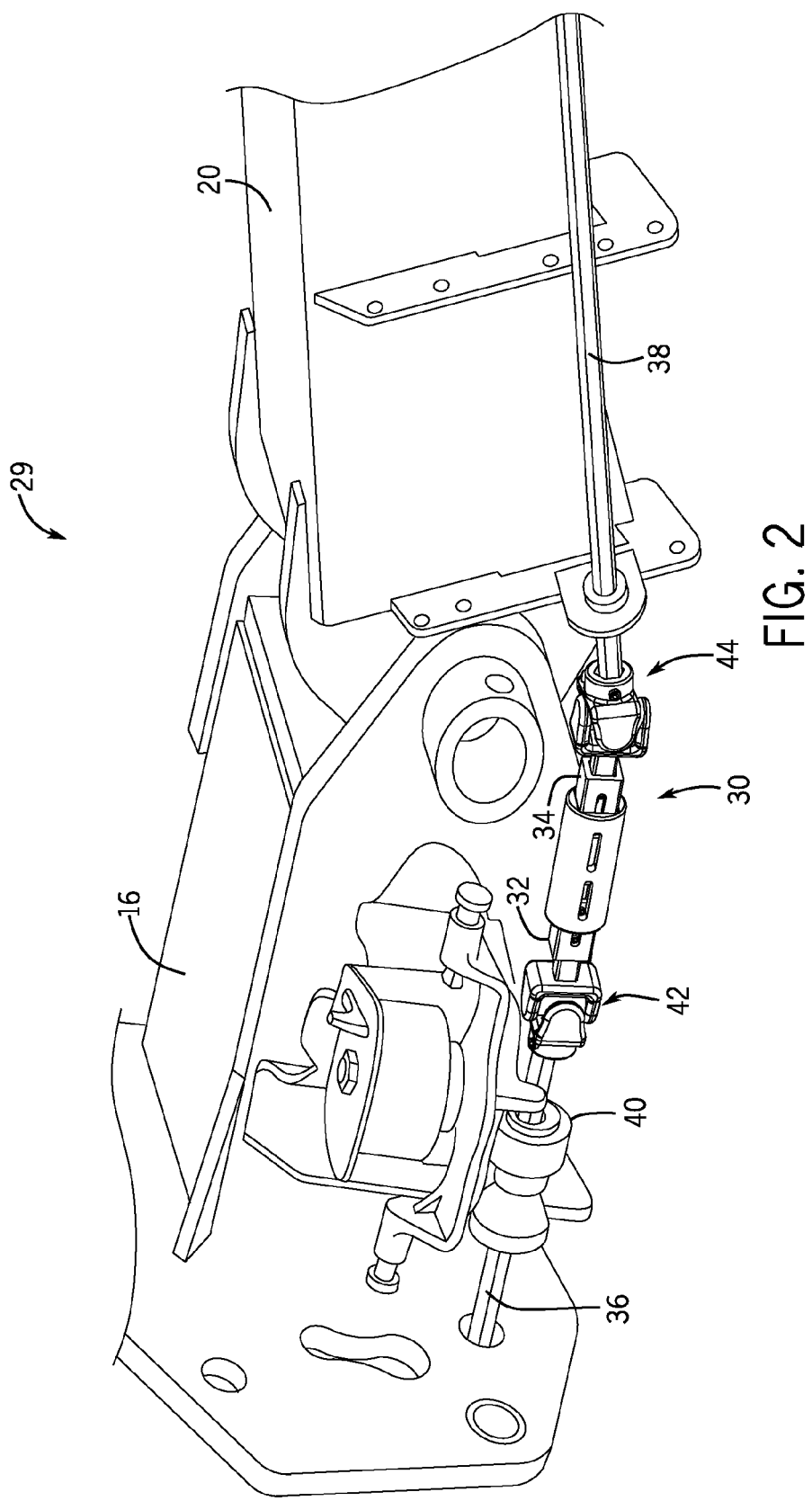
FIG. 2 is a perspective view of an embodiment of a wing tool bar of the agricultural implement of FIG. 1, illustrating a double-telescoping drive shaft in accordance with present embodiments.

FIG. 2 illustrates an exemplary pivot location 29 on the agricultural implement 10 (e.g., planter) of FIG. 1, depicting the wing tool bars 20 being pivotally coupled to the center tool bar 16. In the illustrated embodiment, a double-telescoping drive shaft 30 is disposed at the pivot location 29 and is configured to transfer rotational power from a hydraulic motor (not shown) on the center tool bar 16 to the wing tool bar 20.

During operation of the planter 10, the center tool bar 16 may remain substantially fixed while the wing tool bar 20 moves in multiple directions. As described above, the wing tool bars 20 may transition from a ground engaging position to a compacted transport position. Further, the wing tool bars 20 may be lifted vertically up from the ground engaging position, or may be lowered vertically down to the ground engaging position. In such configurations, the wing tool bars 20 may be lifted up approximately 10° to 20°, and may be dropped down approximately 10° to 20°. In these situations, it may be desirable to have a flexible double-telescoping drive shaft 30 that expands and retracts at the pivot location 29 as the wing tool bars 20 moves in various directions. In particular, the drive shaft 30 may have telescoping functionalities at a first side 32 of the drive shaft 30 and at a second side 34 of the drive shaft 30. As such, the drive shaft 30 may be configured to extend twice as far as a standard shaft without such telescoping properties. Moreover, the double-telescoping drive shaft 30 may provide greater freedom of movement within the limited amount of space available at the pivot location 29.

In certain embodiments, the double-telescoping drive shaft 30 is configured to drivingly couple a first wing shaft 36 with a second wing shaft 38. In the illustrated embodiment, the hydraulic motor (e.g., hydraulic cylinder) attached to the center tool bar 16 may be used to generate rotational power that controls the functions of the planter 10. For example, the rotational power may be used to drive downstream components of the row units 24, such as the metering system configured to deposit seeds into the soil. As such, the rotational power generated by the hydraulic motor may be transferred from the origin to the wing tool bar 20 and/or the row units 24. One or more shafts (e.g., wing shaft 36, wing shaft 28, drive shaft 30, etc.) may be used to transfer the rotational energy from the hydraulic motor to the components of the wing tool bar 24.

The hydraulic motor may be rotatably coupled to a bearing 40 that transfers the rotational energy to the first wing shaft 36. As illustrated in FIG. 2, the first wing shaft 36 may be drivingly coupled to the double-telescoping drive shaft 30 with a first universal joint 42. Further, the drive shaft 30 may be drivingly coupled to the second wing shaft 38 with a second universal joint 44. Each universal joint 42 and 44 may include two yokes, such that one yoke is mounted to the drive shaft 30, while the other is mounted to either the first wing shaft 36 or the second wing shaft 38. In certain embodiments, the universal joints 42 and 44 may be "fixed" points for the drive shaft 30. Other components of the drive shaft 30 may be "floating" within the pivot location 29, such that they are not structurally attached to either the center tool bar 16 or the wing tool bar 20.

Figure 3:
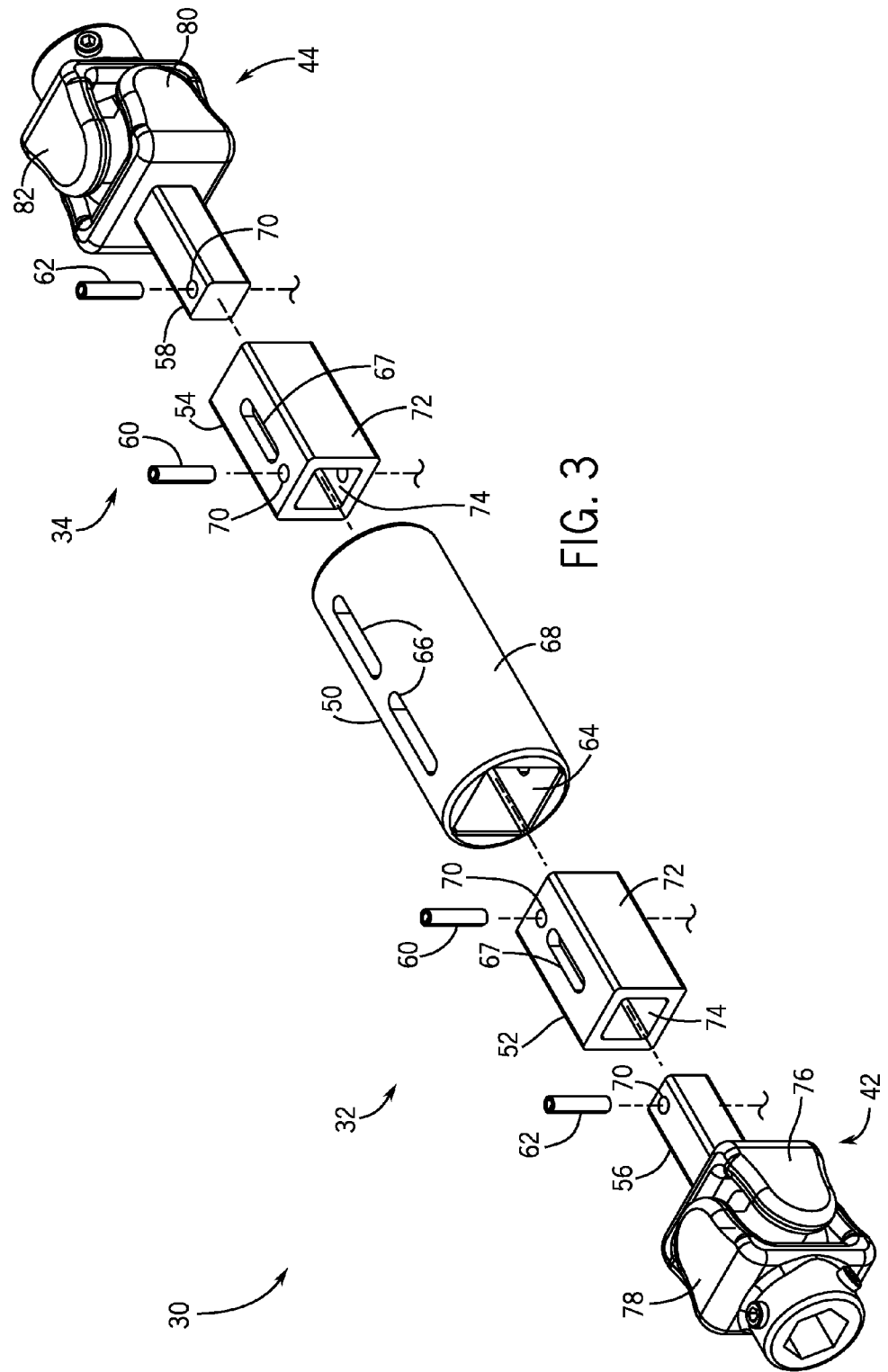
FIG. 3 is an expanded view of the double-telescoping drive shaft of FIG. 2, illustrating a center sleeve, a first intermediate sleeve, a second intermediate sleeve, a plurality of retaining devices, and a pair of universal joints, in accordance with present embodiments.

FIG. 3 is an expanded view of the double-telescoping drive shaft 30 of FIG. 2, illustrating a center sleeve 50, a first intermediate sleeve 52, a second intermediate sleeve 54, a driving shaft 56, a driven shaft 58, a plurality of retaining devices (e.g., first retaining feature 60, second retaining feature 62), and the pair of universal joints 42 and 44. The first intermediate sleeve 52 and the driving shaft 56 may be disposed on the first side 32 of the center sleeve 50. Likewise, the second intermediate sleeve 54 and the driven shaft 58 may be disposed on the second side 34 of the center sleeve 50. As illustrated, the first and second intermediate sleeves 52 and 54 may be substantially the same size and shape, and the driving shaft and the driven shaft may also be substantially the same size and shape. Indeed, the drive shaft 30 is symmetrical along a longitudinal axis and a vertical axis. The components of the drive shaft 30 on the first side 32 may be able to telescopically expand and retract in a first direction, while the components of the drive shaft 30 on the second side 34 may be able to telescopically expand and retract in an opposing direction. In certain embodiments, the components on the first side 32 and the second side 34 telescope at the same time, while in other embodiments, the components on each side 32 and 34 are able to telescope independently of each other.

The center sleeve 50 may be a tubular configuration having open ends on both the first and second sides 32 and 34. In the illustrated embodiment, the center sleeve 50 is a cylinder, however, in other embodiments, the center sleeve 50 may effectively have any tubular shape with a smooth-walled interior running the entire length of the center sleeve 50. In particular, the center sleeve 50 may include an interior surface 64 configured to transfer torque. The interior surface 54 may be any geometric shape (e.g., square, circular, hex, etc.), and may be configure to slidingly receive the first and second intermediate sleeves 52 and 54 having corresponding input shapes. For example, in the illustrated embodiment, the interior surface 64 of the center sleeve 50 is square, and the first and second intermediate sleeves 52 and 54 have substantially square cross-sections so that at least a part of the first and second intermediate sleeves 52 and 54 may be conforming to the interior surface 64 of the center sleeve 50.

In certain embodiments, the center sleeve 50 includes a pair of longitudinal slots 66 disposed in or through an outer surface 68. First retaining features 60 may be disposed through the longitudinal slots 66 and into the receiving slots 70 on the first and second intermediate sleeves 52 and 54. The receiving slot 70 may a depression into the surface of the first and second intermediate sleeves 52 and 54 that is configured to securely hold the first retaining features 60 in place. Various types of retaining features may be used to secure the configuration of the drive shaft 30, such as, for example, pins, bolts, rivets, set screws, bands, clamps, threaded connections, or other similar fasteners allowing telescopic movement. Indeed, the retaining features may be any securing device configured to secure the configuration of the drive shaft 30 when the retaining features are engaged with the receiving slot 70. The first and second intermediate sleeves 52 and 54 may be secured with the first retaining features 60 sufficiently enough to limit traverse, sideward, or other movements as the first and second intermediate sleeves 52 and 54 slidingly engage with the center sleeve 50.

The first and second intermediate sleeves 52 and 54 may also have a pair of longitudinal slots 67 disposed in an outer surface 72. Second retaining features 62 may be disposed through the longitudinal slots 67 and into the receiving slots 70 on either the driving shaft 56 or the driven shaft 58. The second retaining features 62 may be shorter in length than the first retaining features 60, such that both the first and second retaining features 60 and 62 may be used to secure the arrangement of the drive shaft 30 without obstructing the extension and retraction movements of the telescoping sleeves. For example, in certain embodiments, the second retaining features 62 may not come in contact with the interior surface 64 of the center sleeve 50 while the drive shaft 30 is in operation. In other embodiments, the center sleeve 50, and the first and second intermediate sleeves 52 and 54 may have a single longitudinal slot 67 disposed in an outer surface 68 or 72, or may have any number of longitudinal slots 67 (e.g., 3, 4, 5, 6, 7 or more).

In certain embodiments, the driving shaft 56 is slidingly received in the first intermediate sleeve 52, and is at least partially conforming to the interior surface 74 of the first intermediate sleeve 52. Similarly, the driven shaft 58 is slidingly received in the second intermediate sleeve 54, and is at least partially conforming to the interior surface 74 of the second intermediate sleeve 54. The interior surface 74 may be configured to transfer torque, and may effectively have any cross-sectional shape so that the driven shaft 58 and the driving shaft 56 having corresponding input shapes. Further, the driven shaft 56 may be mounted on a first yoke 76 of the universal joint 42, and may be pivotally connected to a second yoke 78 mounted on the first wing shaft 36 with a cross link. The universal joint 42 is able to allow pivotal movement of the first yoke 76 relative to the second yoke 78, and may be able to transfer rotational moment with multiple degrees of freedom. The driven shaft 56 may receive the rotational moment, and may transfer the torque through the interior surfaces 64 and 74 of the drive shaft 30 to the driving shaft 58. The driving shaft 58 may be mounted on a third yoke 80 of the universal joint 44, and may be pivotally connected to a fourth yoke 82 mounted on the second wing shaft 38 with a another cross link. Similar to the universal joint 42, the universal joint 44 may allow pivotal movement of the third yoke 80 relative to the fourth yoke 82, and may be able to transfer rotational power with a multiple degrees of freedom.

The drive shaft 30 has the ability to transmit rotational moment between two elements, and may be able to do so in a telescopically extended state (FIG. 4), a telescopically retracted state (FIG. 5), or any partially extended or partially retracted state in between. Further, the drive shaft 30 may be smoothly movable between the fully extended and the fully retracted positions, as the floating telescoping components of the drive shaft 30 are effectively controlled by the fixed pair of universal joints 42 and 44.

With the forgoing in mind, FIG. 4 is an embodiment of the drive shaft 30 in a telescopically expanded (e.g., lengthened) state. As illustrated, the drive shaft 30 may have two intermediate sleeves 52 and 54 slidingly received in the center sleeve 50 and secured with first retaining features 60. The driven shaft 56 is mounted on the first yoke 76, is slidingly received in the first intermediate sleeve 52, and is secured with the second retaining features 62. Likewise, the driving shaft 58 is mounted on the third yoke 80, is slidingly received in the second intermediate sleeve 54, and is secured with the second retaining features 62.

In a telescopically fully extended state, both the first and second retaining features 60 and 62 of the drive shaft are spaced apart to maximize the overall length 84 of the drive shaft 30. The first retaining feature 60 may terminate further outward longitudinal movement of the telescoping sleeves 52 and 54 within the drive shaft 30 after reaching a position within the longitudinal slots 66 closest to the first yoke 76 and the third yoke 80. Further, the second retaining feature 62 may terminate further outward longitudinal movement of the driven shaft 56 and the driving shaft 58 after reaching a position within the longitudinal slots 67 closest to the first yoke 76 and the third yoke 80. For example, when the first retaining feature 60 securing the first intermediate sleeve 52 within the center sleeve 50 is positioned closest to the yoke 76, intermediate sleeve 52 has reached its greatest extension potential. In certain embodiments, the fully expanded length 86 of the first intermediate sleeve 52 may be substantially the same as the fully expanded length 86 of the second intermediate sleeve 54. In other embodiments, the intermediate sleeves may expand and retract in dependently, and the fully expanded length 86 for the first intermediate sleeve 52 may be different than the second intermediate sleeve 54.

FIG. 5 is an embodiment of the drive shaft 30 in a telescopically retracted (e.g., shortened) state. As illustrated, in the fully retracted position, each of the driven shaft 56, the first intermediate sleeve 52, the second intermediate sleeve 54 and the driving shaft 58 are nearly completely contained in within the center sleeve 50. In a telescopically retracted state, both the first and second retaining features 60 and 62 are positioned closely together to minimize the overall length 84 of the drive shaft 30. Both the first and second retaining features 60 and 62 may terminate further inward longitudinal movement of the telescoping sleeves 52 and 54 within the drive shaft 30 when both the first and second retaining features 60 and 62 are as close together as possible.

In the depicted embodiments, two intermediate sleeves are concentrically arranged to provide telescoping features on the first side 32 and the second side 34 of the drive shaft 30. In other embodiments, the drive shaft 30 may have 4, 6, 8, or 10 intermediate sleeves concentrically arranged to provide telescoping features, such that each side 32 and 34 of the drive shaft 30 includes an equal number of telescoping intermediate sleeves. In yet other embodiments, the first side 32 of the drive shaft 30 may include a greater number of intermediate sleeves, and may provide greater extension and retraction lengths.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A drive coupling, comprising
   a center sleeve comprising an interior surface configured to transfer torque, and left and right open ends opposite one another and communicating with the center sleeve interior surface;
   a first intermediate sleeve slidingly received in the left open end and having a first exterior surface at least partially conforming to the center sleeve interior surface, the first intermediate sleeve comprising a first interior surface configured to transfer torque, and a first open end opposite the center sleeve and communicating with the first interior surface;
   a second intermediate sleeve slidingly received in the right open end and having a second exterior surface at least partially conforming to the center sleeve interior surface, the second intermediate sleeve comprising a second interior surface configured to transfer torque, and a second open end opposite the center sleeve and communicating with the second interior surface;
   a driving member having a driving shaft conforming to the first interior surface of the first intermediate sleeve and slidingly received in the first intermediate sleeve, wherein the driving shaft is free to telescope with respect to the first intermediate sleeve; and
   a driven member having a driven shaft conforming to the second interior surface of the second intermediate sleeve and slidingly received in the second intermediate sleeve, wherein the driven shaft is free to telescope with respect to the second intermediate sleeve.

2. The coupling of claim 1, wherein the center sleeve interior surface extends completely through the center sleeve.

3. The coupling of claim 1, wherein the first intermediate sleeve is substantially identical to the second intermediate sleeve.

4. The coupling of claim 1, wherein the driving shaft is substantially identical to the driven shaft.

5. The coupling of claim 1, wherein the first and second intermediate sleeves are free to telescope a substantially identical length with respect to the center sleeve.

6. The coupling of claim 1, wherein the driving and driven shafts are free to telescope a substantially identical length with respect to the first and second intermediate sleeves, respectively.

7. The coupling of claim 1, wherein the center sleeve comprises at least one slot, and wherein the first and second intermediate sleeves are retained in the center sleeve by retaining members extending into the at least one slot.

8. The coupling of claim 1, wherein the first and second intermediate sleeves each comprise first and second slots, respectively, and wherein the driving and driven shafts are retained in the first and second intermediate sleeves, respectively by retaining members extending into the first and second slots.

9. The coupling of claim 1, wherein the driving shaft or the driven shaft is coupled to a universal joint.

10. The coupling of claim 9, wherein a cross link is used to secure the driving shaft or the driven shaft to the universal joint.

11. A drive shaft, comprising:
a center sleeve configured to transfer torque comprising a left open end and a right open end opposite to the left open end;
a first intermediate sleeve comprising a first end and a second end, wherein the first end is telescopically received in the left open end of the center sleeve, and wherein the first intermediate sleeve is configured to transfer torque;
a first universal joint comprising a first yoke and a second yoke, wherein a driven shaft is mounted on the first yoke and pivotally coupled with a cross link to the second yoke mounted on a first wing shaft, the driven shaft is telescopically received in the second end of the first intermediate sleeve, and the driven shaft is free to telescope with respect to the first intermediate sleeve;
a second intermediate sleeve comprising a third end and a fourth end, wherein the third end is telescopically received in the right open end of the center sleeve, and wherein the second intermediate sleeve is configured to transfer torque; and
a second universal joint comprising a third yoke and a fourth yoke, wherein a driving shaft is mounted on the third yoke and pivotally coupled with the cross link to the fourth yoke mounted on a second wing shaft, the driving shaft is telescopically received in the fourth end of the second intermediate sleeve, and the driving shaft is free to telescope with respect to the second intermediate sleeve.

12. The drive shaft of claim 11, comprising a center sleeve interior surface extends completely through the center sleeve.

13. The drive shaft of claim 12, wherein the first intermediate sleeve comprises a first exterior surface at least partially conforming to the center sleeve interior surface.

14. The drive shaft of claim 12, wherein the second intermediate sleeve comprises a second exterior surface at least partially conforming to the center sleeve interior surface.

15. The drive shaft of claim 11, wherein the first and second intermediate sleeves are free to telescope a substantially identical length with respect to the center sleeve.

16. The drive shaft of claim 11, wherein the driving and driven shafts are free to telescope a substantially identical length with respect to the first and second intermediate sleeves, respectively.

17. The drive shaft of claim 11, wherein the center sleeve comprises at least one slot, and wherein the first and second intermediate sleeves are retained in the center sleeve by retaining members extending into the at least one slot.

18. The drive shaft of claim 11, wherein the first and second intermediate sleeves each comprise first and second slots, respectively, and wherein the driving and driven shafts are retained in the first and second intermediate sleeves, respectively by retaining members extending into the first and second slots.

19. A method of operating a drive shaft, comprising:
generating rotational power via a motor;
transferring the rotational power from the motor to a first wing shaft, wherein the first wing shaft is rotatably coupled to a driven shaft of the drive shaft, and wherein the drive shaft comprises:
a center sleeve comprising a left open end and as right open end, opposite the left open end;
a first intermediate sleeve comprising a first end and a second end, wherein the first end is telescopically and slidingly received in the left open end of the center sleeve, the driven shaft of the drive shaft is telescopically received in the second end of the first intermediate sleeve, and the driven shaft is free to telescope with respect to the first intermediate sleeve; and
a second intermediate sleeve comprising a third end and a fourth end, wherein the third end is telescopically and slidingly received in the right open end of the center sleeve, a driving shaft of the drive shaft is telescopically received in the fourth end of the second intermediate sleeve, and the driving shaft is free to telescope with respect to the second intermediate sleeve; and
transferring rotational power from the driving shaft of the drive shaft to a second wing shaft, wherein the driving shaft is rotatably coupled to the second wing shaft.

20. The method of operating the drive shaft of claim 19, comprising transferring rotational power from the driven shaft through the center sleeve, the first and second intermediate sleeves, and to the driving shaft.

* * * * *